United States Patent [19]

Hiza et al.

[11] Patent Number: 4,632,970

[45] Date of Patent: Dec. 30, 1986

[54] EPOXY RESIN COMPOSITION

[75] Inventors: Misao Hiza, Hiratsuka; Hajime Yamazaki, Hadano; Shigeo Omote, Hiratsuka, all of Japan

[73] Assignee: The Yokohama Rubber Co., Ltd., Tokyo, Japan

[21] Appl. No.: 803,701

[22] Filed: Dec. 2, 1985

[30] Foreign Application Priority Data

Apr. 1, 1985 [JP] Japan .................................. 60-68766

[51] Int. Cl.$^4$ ............................................. C08G 18/38
[52] U.S. Cl. ...................................... 528/27; 525/460
[58] Field of Search ........................... 528/27; 525/460

[56] References Cited

U.S. PATENT DOCUMENTS 4,221,896  9/1980  Endo ...................................... 528/28
4,543,404  9/1985  Sugano et al. ........................ 528/27

Primary Examiner—Maurice J. Welsh
Attorney, Agent, or Firm—Armstrong, Nikaido, Marmelstein & Kubovcik

[57] ABSTRACT

An epoxy resin composition comprising:
(a) a urethane modified epoxy resin obtained by reacting a compound having both epoxy and hydroxy groups with a urethane bond containing compound having an isocyanate group at the end thereof, which is obtained from (i) an organopolysiloxane compound having a molecular weight of 500 to 10000 and having at least two hydroxy groups per one molecule in the main chain or side chain thereof and (ii) a polyisocyanate compound; and
(b) an active organic curing agent.

9 Claims, No Drawings

EPOXY RESIN COMPOSITION

BACKGROUND OF THE INVENTION

1. Field of the Invention

The present invention relates to an epoxy resin composition. More specifically, it relates to an epoxy resin composition having an excellent heat resistance, weathering resistance, and water resistance, excellent compatibility with other epoxy resins, and having flexibility and an appropriate elasticity. The present epoxy resin composition is suitable for uses as, for example, adhesives, coating materials, coating compositions, potting materials, and cushioning materials.

2. Description of the Related Art

It is heretofore known in the art that the peeling strength is generally low when conventional epoxy resins are used as adhesives due to their hardness and brittleness. Since conventional epoxy resins are susceptible to cracking, they cannot be widely used as, for example, structural materials and coating materials. Furthermore, it is difficult for conventional epoxy resins to be used in the applications where both flexibility and elasticity are required (e.g., coating materials for concrete structures, cushioning materials, and potting materials for portions subjected to internal stress) due to their inherent insufficient adhesiveness.

Various attempts have been made to improve the above-mentioned disadvantages of conventional epoxy resins. For example, flexible epoxy resins have been used, which are classified into two groups; i.e., one group in which flexibility is afforded to the skeleton of epoxy resins, and the other in which flexibility is afforded to curing agents. Examples of the former type epoxy resins are glycidyl ester type, polyoxyalkylene glycol type, bisphenol A propylene oxide addition type, urethane modified type, and polybutadiene modified type epoxy resins. However, when these flexible type epoxy resins are used, the curing rate is remarkably so slow that the workability or processability thereof is poor. Furthermore, the resultant cured products exhibit plastic type elongation and, therefore, these epoxy resins are not suitable for use in the above-mentioned materials requiring elasticity. Examples of the above-mentioned flexible curing agents are polyamides (e.g., condensation products of dimeric acids or aliphatic dibasic acids with polyamides), long-chain amines (e.g., polyether amines and modified aliphatic amines), and modified liquid polybutadienes. However, problems arise in these curing agents regarding the compatibility, curing rate, and physical properties of the cured products and, therefore, are not suitable for practical use.

The use of several epoxy resins based on organopolysiloxane has also been proposed due to the facts that polymers having an organopolysiloxane skeleton have excellent characteristics in heat resistance, water resistance, and gas permeability. However, these epoxy resins are disadvantageous in that the reactivity thereof is low, that the cured products are extremely brittle, and that the compatibility thereof with other epoxy resins is poor.

SUMMARY OF THE INVENTION

Accordingly, the objects of the present invention are to eliminate the above-mentioned disadvantages of conventional epoxy resin compositions and to provide an epoxy resin composition having excellently balanced physical properties, good compatibility with other epoxy resins, and desirable flexibility, elasticity, and transparency.

Other objects and advantages of the present invention will be apparent from the following description.

The present invention provides an epoxy resin composition comprising:

(a) a urethane modified epoxy resin obtained by reacting a compound having both epoxy and hydroxy groups with a urethane bond containing compound having an isocyanate group at the end thereof, which is obtained from (i) an organopolysiloxane compound having a molecular weight of 500 to 10,000 and having at least two hydroxy groups per one molecule in the main chain or side chain thereof and (ii) a polyisocyanate compound; and (b) an active organic curing agent.

DESCRIPTION OF THE PREFERRED EMBODIMENTS

The organopolysiloxane compounds having a molecular weight of 500 to 10,000 and at least two hydroxy groups per one molecule in the main chain or side chain thereof usable in the present invention are easily obtained from starting organosiloxanes by various known processes. The hydroxy groups may be bonded either to the main chains or to the side chains, preferably bonded to the ends of the molecule. The preferable organopolysiloxane compounds having two hydroxy groups at both ends of the molecule may be represented by the following general formula;

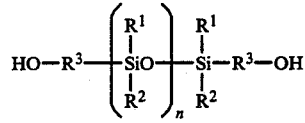

wherein $R^1$ and $R^2$ are independently H, $CH_3$, $C_6H_5$, or $CF_3CH_2CH_2$ and $R^3$ is an alkylene group or an oxyalkylene group having 1 to 10 carbon atoms.

The polyisocyanate compounds usable in the present invention are those having two or more isocyanate groups in the molecule. These polyisocyanate compounds include those which generally used in the production of conventional polyurethane resins. Typical polyisocyanate compounds are tolylene diisocyanate, diphenylmethane diisocyanate, hexamethylene diisocyanate, isophorone diisocyanate, and triphenylmethane triisocyanate.

The urethane bond containing compounds usable in the present invention can be readily obtained by reacting a mixture of the organopolysiloxane compounds with the polyisocyanates. In the above-mentioned reaction, the organopolysiloxane compounds are preferably used in such an amount that the number of the hydroxy group is an equivalent amount or less of one isocyanate group of the polyisocyanate compounds. The most preferable ratio of the hydroxy group of the organopolysiloxane compounds to the isocyanate group of the polyisocyanate compounds is from 0.75 to 0.95.

The compounds having both epoxy and hydroxy groups usable in the present invention are, for example, those having 1 to 3 epoxy groups and 1 to 2 hydroxy groups in the molecule and, preferably, those having a molecular weight of 50 to 2,000. Examples are glycidyl ethers of polyhydroxy alcohols such as glycidol, an glycerol diglycidyl ether, and commercially available epoxy resins containing hydroxyl groups.

The urethane modified epoxy resins usable as compound (a) in the present invention can be readily obtained by reacting the above-mentioned compounds having both epoxy and hydroxy groups with the above-mentioned urethane bond containing compounds. The compounds having both epoxy and hydroxy groups are used in such an amount that the hydroxy group thereof is, preferably, at least equivalent amount of one of the isocyanate groups of the urethane bond containing compounds. More preferably, the ratio of the hydroxy group to the isocyanate group is from 1.0 to 1.2.

The above-mentioned reaction between the isocyanate groups and the hydroxy groups can be carried out optionally in the presence of conventional catalysts for urethane synthesis. Typical catalysts are tertiary amines and organometallic compounds.

The active organic curing agents usable as component (b) in the present invention are preferably aliphatic amines (e.g., ethylene diamine, diethylene triamine), aromatic amines (e.g., meta-phenylene diamine, (diamine-di-phenyl)methane), alicyclic polyamines (e.g., isophorone diamine, 1,3-bis(aminomethyl)cyclohexane), polyamides, amino resins (e.g., butyrated urea resins), acid anhydrides (e.g., phthalic anhydride, maleic anhydride, pyromeric anhydride), and modified aromatic polyamines. Especially, aliphatic amines, such as isophorone diamine and 1,3-bis (aminomethyl) cyclohexane, are preferably used because of fast curing reaction, good workability and transparency of the cured products. Although there is no criticality in the compounding amount of the active organic curing agent to the present epoxy resin composition, the curing agent is preferably used in an amount of 0.1 to 1.2, more preferably 0.5 to 1.0 amine or acid anhydride equivalent of the curing agent based on one epoxy equivalent of the urethane modified epoxy resin in the present invention. In addition to the above-mentioned essential constituents, the epoxy resin composition according to the present invention may optionally contain, other epoxy resins, diluents, pigments, fillers, and the other optional additives conventionally used in epoxy resin compositions. The curing reaction of the present epoxy resin composition can be carried out at room temperature. The curing reaction can be accelerated by heating or by using catalysts together with the curing agents. Any catalyst conventionally used in curing epoxy resins can be also used in the present invention. Typical catalysts are phenols (e.g., cresol, phenol, bisphenol A), tertiary amines (e.g., imidazole, tris (N,N'-dimethylaminomethyl) phenol, and benzylmethylamine), and boron trifluoride amine complexes (e.g., boron trifluoride monoethylamine).

The cured products of the epoxy resin composition in the present invention are transparent and have flexibility and appropriate elasticity. Accordingly, the present epoxy resin composition can be preferably used as adhesives, coating materials, coating compositions (or paints), potting materials, and cushioning materials.

EXAMPLE

The present invention will be further described in, but is by no means limited to, the following Examples and Comparative Examples.

EXAMPLE 1

134.4 g of isophorone diisocyanate was added to 535.1 g organopolysiloxane containing hydroxy groups at both chain ends thereof (hydroxy number=62) under nitrogen atmosphere. The mixture was vigorously stirred. Thereafter, the mixture was added with 0.1 g dibutyltin dilaurate and allowed to react at 80° C. for 5 hours with stirring. The product thus obtained contained 3.7% isocyanate groups.

Then, 44.1 g glycidol was added to the above product and the mixture was allowed to react at 80° C. for about 8 hours until the isocyanate group could not be detected in the mixture. The urethane modified epoxy resin product thus obtained contained epoxy groups (1200 epoxy equivalent) and no isocyanate group.

The epoxy resin obtained above was cured with isophorone diamine as a curing agent at 100° C. for 1 hour. The resultant product was substantially crystal clear. Typical properties of the product are shown in Table 1. Tensile tests were carried out with crosshead speed of 50 mm/min at ambient temperature.

EXAMPLE 2

20 g of bisphenol A - diglycidyl ether type liquid epoxy resin (175 epoxy equivalent) was added to 80 g of the epoxy modified organopolysiloxane obtained in Example 1. The mixture was thoroughly stirred until it became clear, and then cured with isophorone diamine as a curing agent at 100° C. for 1 hour.

The typical properties of the resultant product were determined in the same manner as in Example 1 as shown in Table 1.

Comparative Example 1

Epoxy modified organopolysiloxane having no urethane bond (i.e., KF101 available from Shin-Etsu Chemical Co., Ltd., Epoxy equivalent=350) was cured with isophorone diamine at 100° C. for 1 hour.

The typical properties of the resultant product were determined in the same manner as in Example 1 as shown in Table 1. It is clear from the results shown in Table 1 that the tensile strength of the product of Comparative 1 is lower than that of Example 1.

Furthermore, when 80 g KF 101 was thoroughly mixed with 20 g bisphenol A diglycidyl ether type liquid epoxy resin (175 epoxy equivalent of 175) with stirring, a turbid white mixture was formed. The turbid mixture was cured with isophorone diamine at 100° C. for 1 hour. The resultant cured product was extremely so brittle that the physical properties could not be determined. This brittleness seems to be caused by poor compatibility of the epoxy silicone with conventional epoxy resins.

TABLE 1

| | Formulation | | Tensile properties of cured product | |
|---|---|---|---|---|
| | Epoxy resin | Isophorone diamine | | |
| No. | (parts by weight) | (parts by weight) | Strength at break (kg/cm$^2$) | Elongation at break (%) |
| Example 1 | 100 | 3.4 | 80 | 320 |
| Example 2 | 100 | 7.4 | 140 | 105 |
| Comparative Example 1 | 100 | 11.7 | 35 | 50 |

The epoxy resin composition in the present invention is proposed by using, as a main ingredient, liquid epoxy resins having organopolysiloxane skeleton, which has excellent heat resistance, water resistance, and flexibility, and containing urethane bonds. Therefore, the resultant cured product has remarkably improved tensile strength and elongation, and excellent transparency. The substantially crystal-clear cured product is obtained.

In addition, the cured product has high strength, desired elasticity, and large flexibility. The strength and flexibility of the cured product can be easily controlled by the addition of the other epoxy resins. Furthermore, the mixture with the other epoxy resins is transparent after curing with the amines.

The epoxy resin composition in the present invention has the above-mentioned characteristics. Therefore, it can be used in various fields, for example, potting materials, cushioning materials, coating materials, coating composition (or paints), adhesives, and insulating materials, due to the elasticity and flexibility thereof.

We claim:

1. An epoxy resin composition comprising:
   (a) a urethane modified epoxy resin obtained by reacting a compound having both epoxy and hydroxy groups with a urethane bond containing compound having an isocyanate group at the end thereof, which is obtained from (i) an organopolysiloxane compound having a molecular weight of 500 to 10000 and having at least two hydroxy groups per one molecule in the main chain or side chain thereof and (ii) a polyisocyanate compound; and
   (b) an active organic curing agent.

2. An epoxy resin composition as claimed in claim 1, wherein the organopolysiloxane compound has the following general formula:

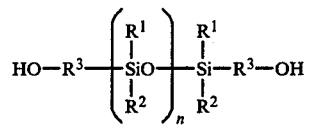

wherein $R^1$ and $R^2$ are independently H, $CH_3$, $C_6H_5$, or $CF_3CH_2CH_2$ and $R^3$ is an alkylene group or an oxyalkylene group having 1 to 10 carbon atoms.

3. An epoxy resin composition as claimed in claim 1, wherein the polyisocyanate compound has two or more isocyanate groups in the molecule.

4. An epoxy resin composition as claimed in claim 1, wherein the ratio of the hydroxy group of the organopolysiloxane compound to the isocyanate group of the polyisocyanate is from 0.75 to 0.95.

5. An epoxy resin composition as claimed in claim 1, wherein the compound having both epoxy and hydroxy groups has 1 to 3 epoxy groups and 1 to 2 hydroxy groups.

6. An epoxy resin composition as claimed in claim 5, wherein the molecular weight of the compound is 50 to 2000.

7. An epoxy resin composition as claimed in claim 1, wherein the ratio of the hydroxy group of said compound having both epoxy and hydroxy groups to the isocyanate group of said urethane bond containing compound is from 1.0 to 1.2.

8. An epoxy resin composition as claimed in claim 1, wherein the curing agent is at least one member selected from the group consisting of aliphatic amines, aromatic amines, alicyclic polyamides, polyamides, amino resins, acid anhydrides, and modified aromatic polyamines.

9. An epoxy resin composition as claimed in claim 8, wherein the amount of said curing agent is 0.1 to 1.2 amine equivalent based on one epoxy equivalent of the urethane modified epoxy resin.

* * * * *